US010025861B2

(12) United States Patent
Yi et al.

(10) Patent No.: US 10,025,861 B2
(45) Date of Patent: Jul. 17, 2018

(54) PRIORITIZING ITEMS FROM DIFFERENT CATEGORIES IN A NEWS STREAM

(71) Applicant: Yahoo! Inc., Sunnyvale, CA (US)

(72) Inventors: Xing Yi, Milpitas, CA (US); Scott Gaffney, Palo Alto, CA (US)

(73) Assignee: Oath Inc., New York, NY (US)

( * ) Notice: Subject to any disclaimer, the term of this patent is extended or adjusted under 35 U.S.C. 154(b) by 225 days.

(21) Appl. No.: 14/012,932

(22) Filed: Aug. 28, 2013

(65) Prior Publication Data
US 2015/0066959 A1    Mar. 5, 2015

(51) Int. Cl.
G06F 17/30    (2006.01)

(52) U.S. Cl.
CPC .... G06F 17/30867 (2013.01); *G06F 17/3061* (2013.01); *G06F 17/30707* (2013.01)

(58) Field of Classification Search
None
See application file for complete search history.

(56) References Cited

U.S. PATENT DOCUMENTS

| | | | | |
|---|---|---|---|---|
| 8,843,491 | B1* | 9/2014 | Mazniker | G06F 17/30867 707/737 |
| 2008/0077659 | A1* | 3/2008 | Ozveren et al. | 709/203 |
| 2009/0282022 | A1* | 11/2009 | Bennett | G06F 17/30675 |
| 2010/0318426 | A1* | 12/2010 | Grant et al. | 705/14.66 |
| 2010/0325111 | A1* | 12/2010 | Aravamudan | G06F 17/30035 707/737 |
| 2011/0040760 | A1* | 2/2011 | Fleischman | G06Q 30/02 707/737 |
| 2011/0184925 | A1* | 7/2011 | Muth | 707/706 |
| 2011/0264665 | A1* | 10/2011 | Mital et al. | 707/741 |
| 2011/0307411 | A1* | 12/2011 | Bolivar | G06Q 30/0282 705/347 |
| 2012/0151511 | A1* | 6/2012 | Bernard | H04H 60/37 725/10 |
| 2012/0296919 | A1* | 11/2012 | Sinha et al. | 707/749 |

(Continued)

OTHER PUBLICATIONS

Normalization by Standard Deviation ("Normalization by Standard Deviation." The University of Minnesota, Jul. 7, 2013. Web. Jun. 2, 2016. <https://web.archive.org/web/20130707113919/http://www.d.umn.edu/~deoka001/Normalization.html>.).*

*Primary Examiner* — Aleksandr Kerzhner
*Assistant Examiner* — Eddy Cheung
(74) *Attorney, Agent, or Firm* — Martine Penilla Group, LLP

(57) ABSTRACT

Methods, systems, and computer programs are presented for displaying a customized news stream. One method includes an operation for identifying dwell times spent by users while accessing a first plurality of items, each item belonging to one media type from a plurality of media types (e.g., news articles, videos, slide shows, etc.). In addition, the method includes operations for determining statistical parameters for each media type based on the identified dwell times, and for detecting a news corpus having a second plurality of items. A priority for each item in the news corpus is determined based on the media type of the item, the corresponding statistical parameters for the media type of the item, and the profile of a user. The news stream is sent to the user for presentation on a display, the news stream being sorted based on the priority of the items in the news corpus.

14 Claims, 9 Drawing Sheets

(56) References Cited

U.S. PATENT DOCUMENTS

| | | | |
|---|---|---|---|
| 2012/0304072 A1* | 11/2012 | Mercuri et al. | 715/745 |
| 2013/0066863 A1* | 3/2013 | Rose | 707/730 |
| 2013/0103624 A1* | 4/2013 | Thieberger | 706/12 |
| 2013/0232430 A1* | 9/2013 | Reitan | 715/765 |
| 2014/0025692 A1* | 1/2014 | Pappas | 707/754 |
| 2014/0289241 A1* | 9/2014 | Anderson | G06F 17/30038 707/736 |
| 2014/0337436 A1* | 11/2014 | Hoagland et al. | 709/204 |
| 2015/0012363 A1* | 1/2015 | Grant et al. | 705/14.66 |

\* cited by examiner

PRIORITIZING ITEMS FROM DIFFERENT CATEGORIES IN A NEWS STREAM

CROSS REFERENCE TO RELATED APPLICATIONS

This application is related by subject matter to U.S. patent application Ser. No. 13/843,433) filed Mar. 15, 2013, and entitled "Display Time of a Web Page"; and U.S. patent application Ser. No. 13/843,504) filed Mar. 15, 2013, and entitled "PAGE PERSONALIZATION BASED ON ARTICLE DISPLAY TIME", all of which are incorporated herein by reference.

BACKGROUND

1. Field of the Invention

The present embodiments relate to methods for personalizing news, and more particularly, methods, systems, and computer programs for prioritizing items, which may be of different types of media, in the new stream.

2. Description of the Related Art

The Internet has witnessed an explosive growth of online news. According to a recent report, more than 123 million people visited news websites such as Yahoo!™ News in May 2010, representing 57 percent of the total U.S. internet audience, with each visitor reading 43 pages on average. These numbers have been steadily increasing over the past years and show the growing appeal of reading news online.

Different people like different types of news content. In order to provide a better news-reading experience, some news websites recommend different types of media to users based on past behavior. Personalized news deliver a news stream to a user, according to the desires and use trends of the user. However, customizing the news stream is a complex problem because the number of news sources and the multiple types of available media continue to grow rapidly.

The different types of media may include news articles, videos, slideshows, tweets, photos, blogs, etc. However, creating a custom news stream for a user is challenging when different types of media are included. It is difficult to prioritize items from one type of media when compared to other types of media items because their use is different. Further, some items may carry little contextual information, such as a photograph, which complicates the determination of the content of the photograph.

Recommending interesting news articles to users has become extremely important for internet news providers looking to maintain users' interest. While existing Web services, such as Yahoo!, attract users' initial clicks, ways to engage users after their initial visit are largely under explored.

It is in this context that embodiments arise.

SUMMARY

Methods, devices, systems, and computer programs are presented for prioritizing items in a personalized news stream. It should be appreciated that the present embodiments can be implemented in numerous ways, such as a method, an apparatus, a system, a device, or a computer program on a computer readable medium. Several embodiments are described below.

In one embodiment, a method includes an operation for identifying dwell times spent by users while accessing a first plurality of items, each item belonging to one media type from a plurality of media types (e.g., news articles, videos, slide shows, etc.). In addition, the method includes operations for determining statistical parameters for each media type based on the identified dwell times, and for detecting a news corpus having a second plurality of items. A priority for each item in the news corpus is determined based on the media type of the item, the corresponding statistical parameters for the media type of the item, and the profile of a user. The news stream is sent to the user for presentation on a display, the news stream being sorted based on the priority of the items in the news corpus. In one embodiment, the operations of the method are executed by a processor.

In another embodiment, a non-transitory computer-readable storage medium, storing a computer program for displaying a customized news stream, includes program instructions for identifying dwell times spent by users while accessing a first plurality of items, each item belonging to one media type from a plurality of media types. In addition, the storage medium includes program instructions for determining statistical parameters for each media type based on the identified dwell times, and program instructions for detecting a news corpus having a second plurality of items. Further yet, the storage medium includes program instructions for determining a priority for each item in the news corpus based on a media type of the item, the corresponding statistical parameters for the media type of the item, and a profile of a user. Further, the storage medium includes program instructions for sending a news stream to the user for presentation on a display, the news stream being sorted based on the priority of the items in the news corpus.

In yet another embodiment, a method for displaying a customized news stream includes an operation for identifying dwell times spent by users while accessing a first plurality of items, each item belonging to one media type from a plurality of media types. The method further includes operations for determining statistical parameters for each media type based on the identified dwell times, and for detecting a news corpus having a second plurality of items. The method further includes an operation for determining a first priority for each item in the news corpus based on a media type of the item and the corresponding statistical parameters for the media type of the item. A second priority for each item in the news corpus is determined based on the first priority and a profile of a user. Further, the method includes an operation for sending a news stream to the user for presentation on a display, the news stream being sorted based on the second priority of the items in the news corpus. In one embodiment, the operations of the method are executed by a processor.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, systems, and computer programs for displaying a customized news stream. It will be apparent, that the present embodiments may be practiced without some or all of these specific details. In other instances, well known process operations have not been described in detail in order not to unnecessarily obscure the present embodiments.

Figure 1:
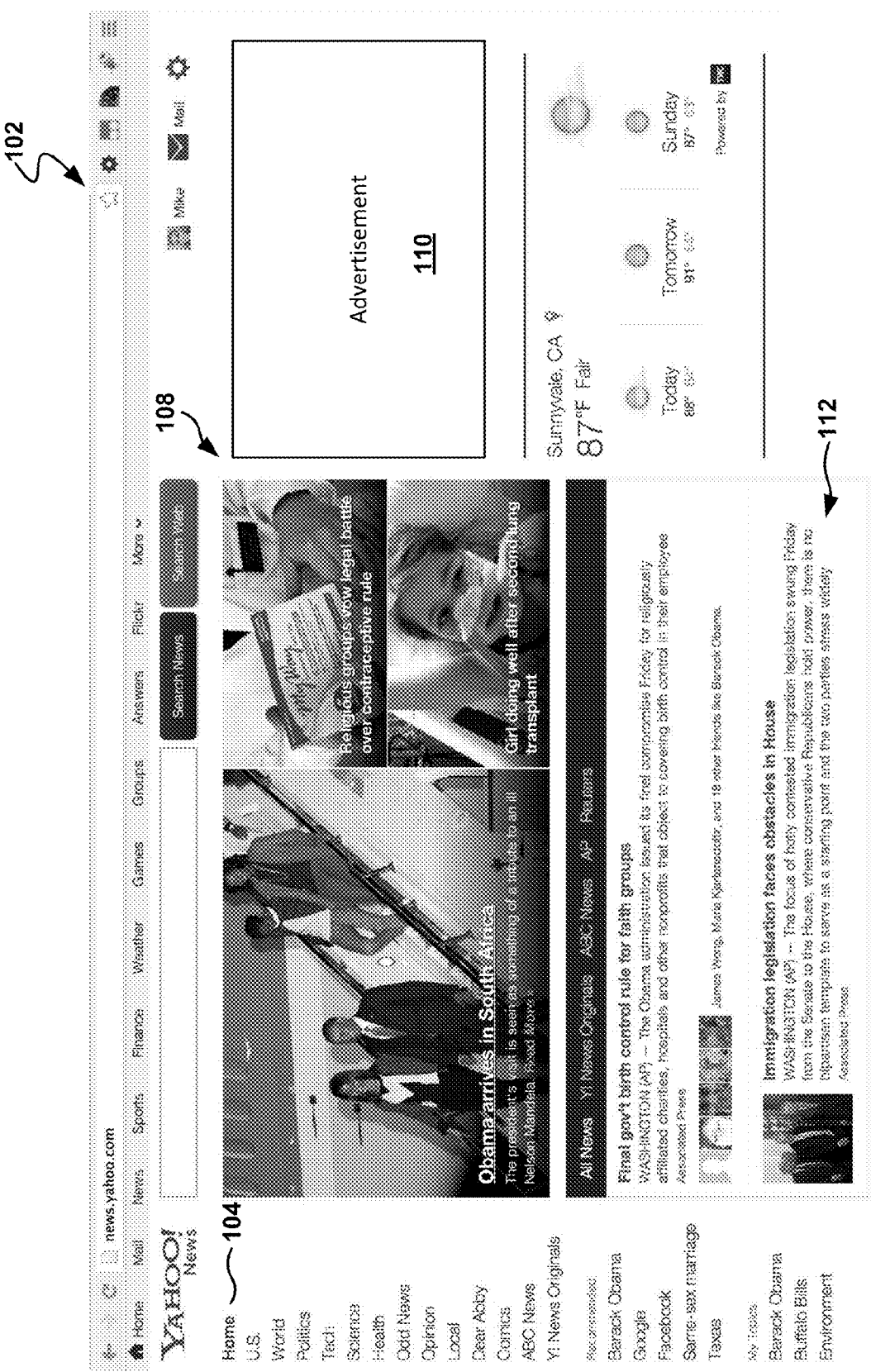
FIG. 1 shows a home page provided by an Internet news service, according to one embodiment.

FIG. 1 shows a home page provided by an Internet news service, according to one embodiment. In one embodiment, the online news page 102 includes a plurality of links 104, also referred to as tabs, each link being provided for the selection of a news topic. Examples of news topics include News, Sports, International, Finance, Food, Lifestyle, Technology, Travel, Shopping, Entertainment, etc. When the user selects one of the tabs, the news page displays the news articles related to the selected tab, except for the Home tab where the user is taken back to the news homepage.

The online news page 102 may also include a personalized news stream 112, an area for headline news or featured news 108, an advertisement area 110, etc. A personalized news stream includes a plurality of news items presented in a custom order for a user, where the custom order is based, at least, on user parameters. In addition, the sorting of the news item may be based on other factors, such as news item relevance, news item creation date, etc.

The user parameters used for sorting the personalized new streams may include one or more of user demographic data (e.g., gender, age, address, country, etc.), employment, interests, search history, news-reading history, user-configured topics of interest, hobbies, etc.

The personalized news stream 112 includes news items that may be of different types, such as news articles, videos, slideshows, tweets, blogs, photographs, etc. Embodiments presented herein automatically create a personalized news stream having items from different types, where the personalized news stream is custom made for the user accessing the news page.

In the past, click-based approaches have been used to rank the relevance of news items. However, when considering different types of media, click-based approaches do not provide good results when comparing news articles, videos, slideshows, etc.

A new metric has been developed to measure the amount of time that a news item is presented to a user, or the amount of time that the user interacts with the news item. This new metric is referred to as dwell time, but it can also be referred to as dwell time, time spent, time of display, time between clicks, etc. In one embodiment, dwell time is defined as the amount of time that a page is physically displayed to a user. However, the dwell time may also be adjusted based on other factors, such as when a user leaves the computer unattended because the news item may be displayed for a long time, but the user is not actually accessing the news item. Therefore, the dwell time may be adjusted based on user activity to reflect the amount of time that the user is actually viewing or interacting with the news item.

Typically, when a user is viewing news on a news webpage, the user clicks on an article and the web browser moves to a different page to display the article. The user spends time reading the article and then returns to the news webpage. In one embodiment, dwell time measures the time difference between the time when the user clicked the article and the time when the user returned to the news webpage.

Users will spend longer times on articles of interest to them, and less time on articles that are not interesting, either because the article is old, the user is not interested in the topic, the user has already read this article or another article with the same content, etc.

Advertisement dwell time has been used for pricing advertisement in websites, as the amount of time that the user views an ad is a good metric for charging advertisers. The dwell time may also be used to recommend news content to the user, and to determine how interested a user is in viewing news item within different categories of news items.

Embodiments presented herein describe methods for identifying news items of interest to a user based, at least, in the time spent reading news articles. However, when trying to compare news items of different types (e.g., news article versus a video clips), the average dwell time is typically different between the different types. For example, news articles are read faster than videos, as users are forced to watch the length of the video, unless the user quits watching the video before it ends. Further, the device used to access news item may also affect the dwell time, as historical data has shown that users tend to spend less time on an article on a mobile device that on a desktop.

In order to compare the relevance of news items of different types, the dwell times are normalized to account for the different characteristics associated with the different types of media.

Embodiments presented herein address these problems by extracting comparable user engagement signals in a common space for personalization with unified content stream, including modeling, ranking and performance measurement.

It is noted that the embodiment illustrated in FIG. 1 is exemplary. Other embodiments may utilize different webpage layouts, additional or fewer sections, present the sections in different order, utilize different news topics, etc. The embodiments illustrated in FIG. 1 should therefore not be interpreted to be exclusive or limiting, but rather exemplary or illustrative.

Figure 2:
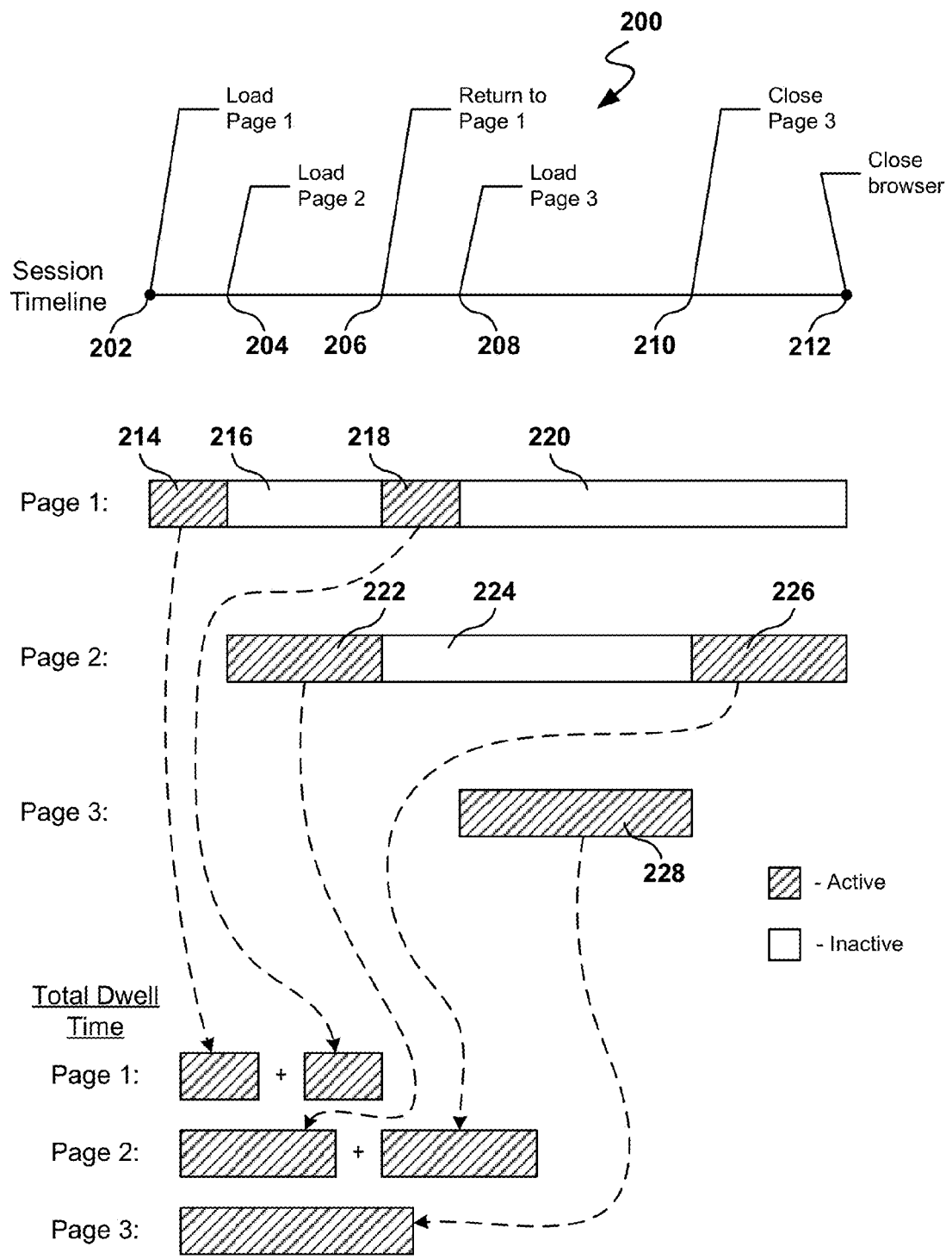
FIG. 2 conceptually illustrates the determination of dwell time for multiple pages having multiple periods of display, in accordance with one embodiment.

FIG. 2 conceptually illustrates the determination of dwell time for multiple pages having multiple periods of display, in accordance with one embodiment. By determining accurate measurements of dwell time, it is possible to discover users' interests and build better user interest profiles for article recommendation or ad selection.

A timeline 200 is representative of a user's session interfacing with various pages via a browser. At time 202 the browser is opened and a Page 1 is opened for viewing in a first tab of the browser. At time 204, a Page 2 is loaded in a second tab of the browser for viewing by the user. At time 206, the user returns to viewing Page 1 in the first tab. At time 208, a Page 3 is loaded in a third tab of the browser. At time 210, the third tab containing Page 3 is closed and the user returns to viewing Page 2 in the second tab. At time 212, the browser is closed, thereby closing the first and second tabs and ending the user's browsing session.

It is noted, that the embodiment of FIG. 2 calculates dwell time based on the use of tab browsing. However, the principles presented herein may also be utilized with users that view news articles within the same webpage, i.e., clicking on a news article, reading it, and then returning to the news page.

The total time of availability of Page 1 (the time Page 1 was open and available for possible viewing, regardless of whether Page 1 was actually displayed or not) spans the time period from time 202 to time 212, as the first tab was open for the entire time that the browser was open. During time period 214 defined between time 202 and time 204, Page 1 was actively displayed. During time period 216 defined between time 204 and time 206, Page 1 was hidden. Subsequently, during time period 218 defined between time 206 and time 208, Page 1 was displayed again. And during time period 220 defined between time 208 and time 212, Page 1 was hidden. Thus, the total display time for Page 1 is defined by the sum of time periods 214 and 218.

The total time of availability of Page 2 spans the time period from time 204 to time 212, as the second tab was opened at time 204 and was not closed until the browser was closed at time 212. During time period 222 defined between time 204 and time 206, Page 2 was actively displayed in the second tab. During time period 224 defined between time 206 and time 210, Page 2 was hidden from view. And during time period 226 defined between time 210 and time 212, Page 2 was displayed again as the user returned to viewing the second tab. Thus, the total display time for Page 2 is defined by the sum of the time intervals 222 and 226.

The total time of availability for Page 3 is the same as its total display time, as Page 3 was opened in the third tab and subsequently the third tab was closed. Thus, the total display time of Page 3 is the time period 228 defined between time 208 and time 210.

It will be appreciated that the time interval 216 during which Page 1 was hidden corresponds to the time interval 222 during which Page 2 was displayed. The time interval 220 during which Page 1 was hidden corresponds to the sum of the time intervals 228 and 226, during which Pages 3 and 2 were displayed, respectively. And the time interval 224 during which Page 2 was hidden corresponds to the sum of the time intervals 218 and 228, during which Pages 1 and 3 were respectively displayed.

The approximate display time for a page can be determined by logging certain events and analyzing time intervals between these events. Broadly speaking, a log of an event includes the type of event that occurred and a corresponding timestamp indicating the time at which the event occurred.

As discussed above, dwell times is used to implement a normalized approach for extracting comparable user engagement signals for personalization within a unified news stream. This approach can be applied to multiple content types and multiple devices.

Figure 3:
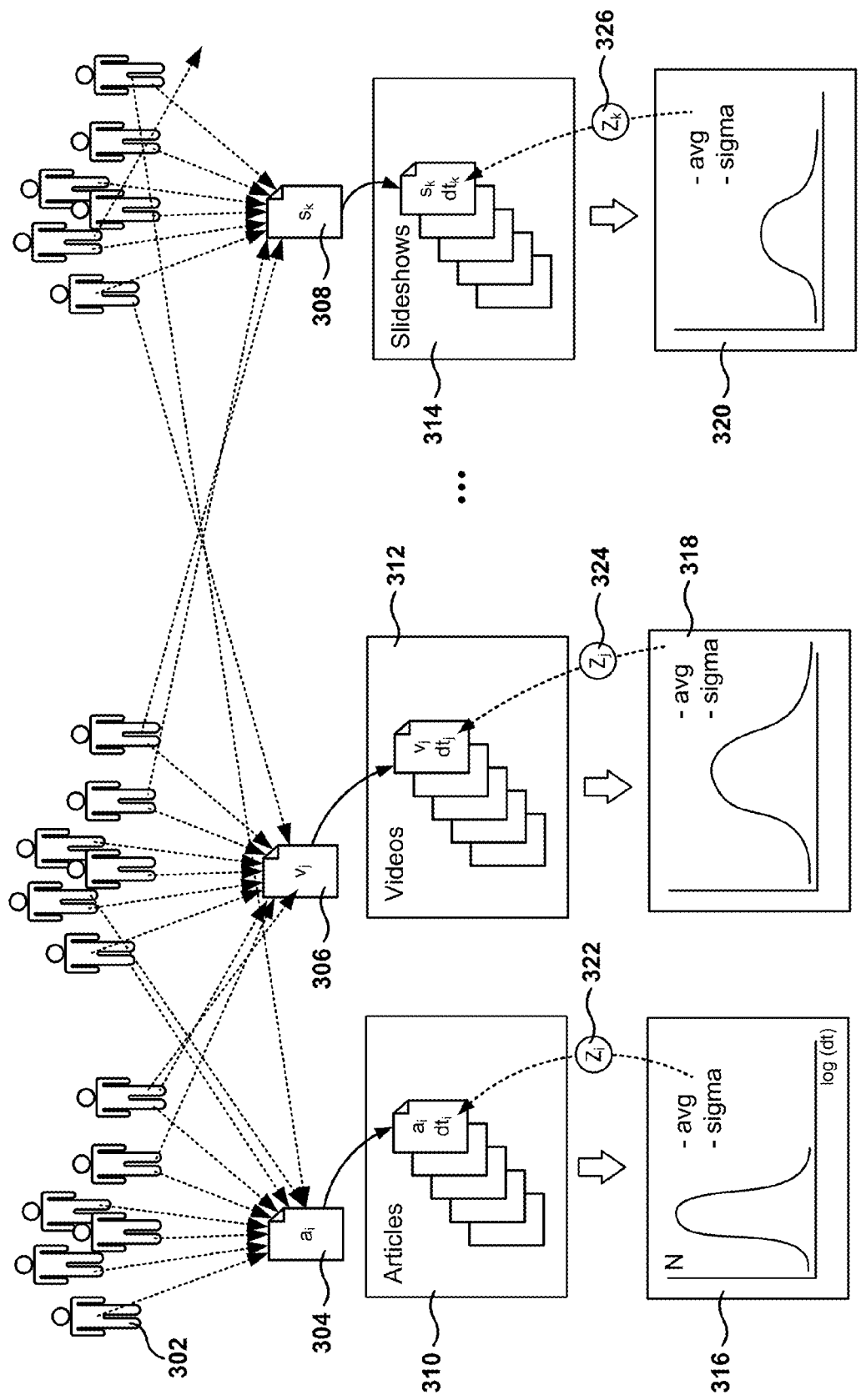
FIG. 3 illustrates the creation of normalized values for the different types of media, according to one embodiment.

FIG. 3 illustrates the creation of normalized values for the different types of media, according to one embodiment. A plurality of users 302 are reading a news article a, 304, a video $v_j$ 306, a slideshow $s_k$ 308, etc.

News article a, 304 is part of a corpus of articles 310, which includes a plurality of news articles available to users reading a news webpage. Similarly, video $v_j$ 306 belongs to a corpus of videos 312 of videos available to users accessing the news webpage; and slideshow $s_k$ 308 belongs to a corpus of slideshows 314. Other embodiments may include other types of news items, such as blogs, presentations, etc.

As the users 302 access the different news items, the system calculates the dwell time statistics for each of the news items. Article a, 304 has a dwell time $dt_i$, video $v_j$ 306 has a dwell time $dt_j$, and the slideshow $s_k$ 308 has a dwell time $dt_k$.

Once the dwell times have been calculated for items in each of the categories (for all of the items, or for a statistically significant number of items), the statistical analysis is performed to determine, among other things, the distribution of the dwell times for the items in each category.

Histogram chart 316 illustrates exemplary distribution of the dwell time versus the number of users for news articles. The horizontal access is the log(dwell time) and the vertical access is the number of users within each of the corresponding dwell times. The logarithm of dwell time (log(dwell time)) is used, as empirical data shows that using the logarithm of dwell time as the unit of measurement for the x access results in typical bell-shape curves, but any other types of dwell-time functions or units may also be used for calculating the statistical parameters. Other parameters calculated for each category includes the average dwell time and a standard deviation (Sigma) in the log(dwell time) space.

Similarly, statistical values 318 are obtained for videos and for slideshows 320. In one embodiment, the statistical values are populated for 3 subtopics within each category: desktop, tablet, and mobile devices. There are different ways of calculating the dwell time, such as by using a beacon approach or an approach based on focus/blur approach, which is based on logged users' browsing activities to estimate users' dwell time for those pages.

Similarly, the dwell times of videos in the stream, as well as videos in the landing pages reference in the news stream, are calculated for a period of time. It is noted, that dwell time for videos may be affected by advertisements, which are sometimes presented before the videos. This may cause some users to quit the video as the users may not wish to see the advertisements. In one embodiment, the values of dwell times of videos that have been exited before the completion of the advertisement are discarded for the purposes of calculating the statistical values associated with video viewing. In another embodiment, all measurements of video clip viewing are utilized.

The dwell times for viewers watching slideshows are also calculated. As expected, the number of users viewing slideshows is much smaller than the number of users reading news articles. Therefore, in one embodiment, to obtain slideshow metrics, a longer observation period of time is taken for measuring the dwell times of slideshows.

Although the distributions of users' per-item dwell time varies for the different types of content, it has been observed that the distribution within items of one category stays substantially constant over long periods of time. In the logarithmic space for the dwell time, most of the dwell time distributions for each different content-type on different device platforms follow behaviors approximate to a normal distribution.

In order to compare items from different categories, the dwell time values are normalized for each category, taking into consideration the average values and the standard deviations. This way, the normalized values reflect a standard measurement of the dwell time that is consistent for all types of content.

The normalized value is referred to herein as the z-score in the log space of the dwell time. The z-score is utilized as user engagement signals for personalization with multiple types of content.

In one embodiment, the z-score is calculated with the following equation:

$$z(x) = \frac{\log(dwelltime(x)) - avg(x)}{sigma(x)} \quad (1)$$

Where z(x) is the normalized value of item x, dwelltime (x) is the dwell time for item x, avg(x) is the average valued of the log(dwelltime) for items in the same category as x, and sigma(x) is the standard deviation for the log(dwelltime) for items in the same category as x.

In one embodiment, the normalized values are calculated by news category and news subcategory, wherein the news subcategory represents the computing device utilized to access news by the user. For example, news articles read on a mobile device are normalized based on the dwell times of news articles read on a mobile device. In another embodiment, the normalized values are calculated by news category, and the statistical values are calculated for all the news articles, with disregard of the device in which the news article is being accessed.

When creating the new stream for a user, the system assesses the perceived value to the user for each of the items in the corpus. In order to compare items from different categories (e.g., news articles versus videos), the scores for the different potential items for the news stream are normalized. Therefore, for any recommended new item in the content-stream, its time spent is normalized by computing its z-score in the log space {using equation (1) z-score=[log (new-item dwelltime)–average(dwelltime)]/sigma (dwell time)}, for that content type and device. This z-score is used as users' engagement signals for recommending items of multiple types in the personalized stream, or for measuring the online performance of the unified personalized stream.

The z-score is utilized for building better user interest profiles, and for providing better optimization signals for machine learning ranking or collaborative filtering models for personalization.

Therefore, embodiments leverage content consumption dwell time distributions of different content-types for normalizing users' engagement signals into the same space, so these engagement signals can be used for recommending multiple content-types of items to the user in the content stream. Further, the use of z-scores provides a method for measuring the performance of the personalized unified stream with multiple content-type items.

In another embodiment, the z-scores are calculated by news category and access device. This way, the personalized news stream may be personalized according to the computing device that the user utilizes for accessing the news stream.

Figure 4:
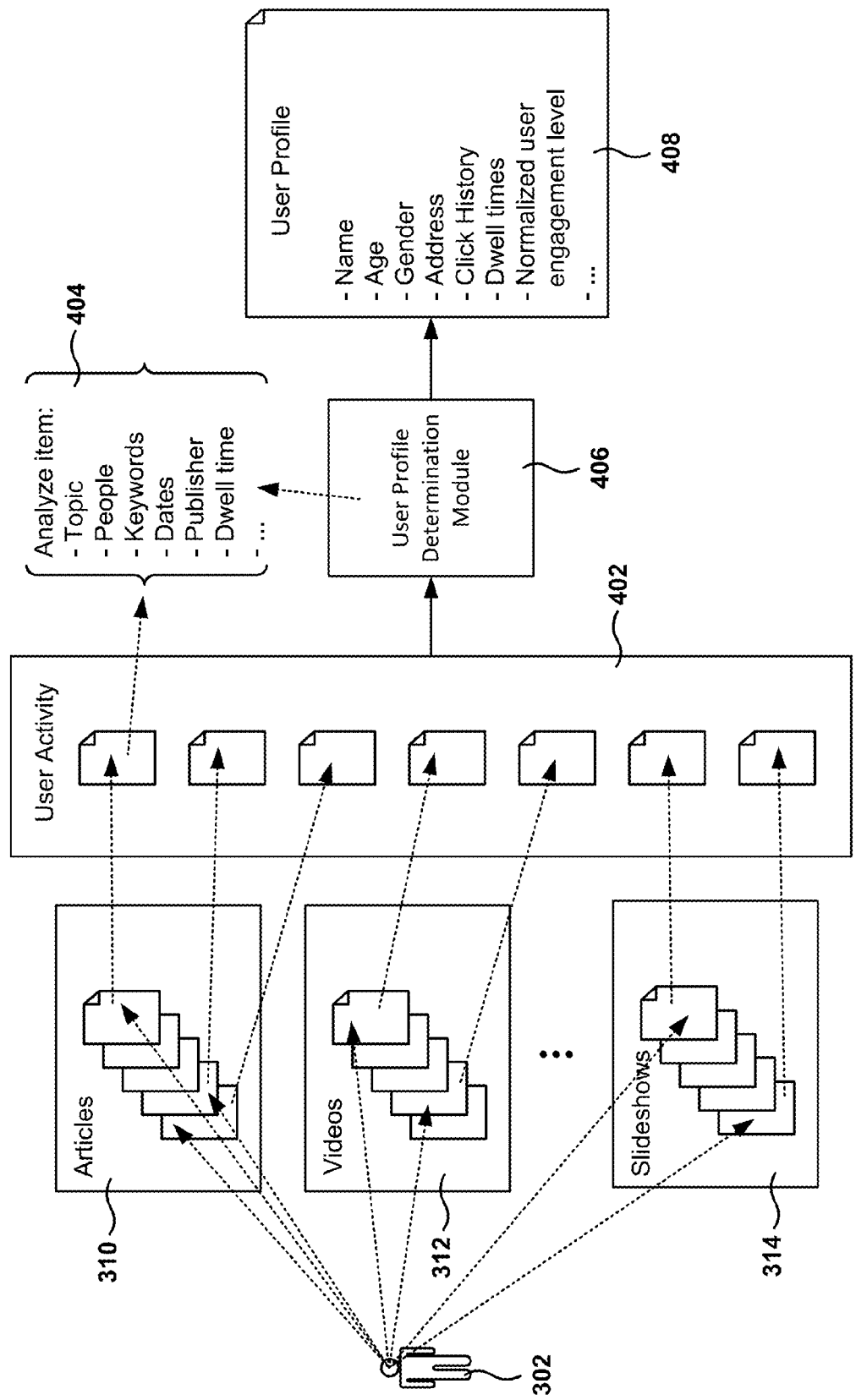
FIG. 4 illustrates the creation of a user profile based on user activities, according to one embodiment.

FIG. 4 illustrates the creation of a user profile based on user activities, according to one embodiment. As user 302 accesses the news stream, the user accesses items of different types, such as news articles 310, videos 312, slideshows 314, etc. Over time, the activity of the user 402 is tracked by the system in order to create a profile 408 that assists the news stream personalization module to deliver news items to the user that are most likely to be of interest to the user. The items in the new stream are sorted according to the perceived value of the item for the user. The goal is to recommend items of different types and embed them within the news stream according to the perceived value for the user.

In one embodiment, as an individual interacts with a software application, e.g., an instant messenger or electronic mail application, descriptive content may be identified. The descriptive content may be in the form of signals or stored physical states within memory, such as, for example, an email address, instant messenger identifier, phone number, postal address, message content, date, time, etc. The descriptive content may be stored, typically, along with contextual content. For example, how a phone number came to be identified (e.g., it was contained in a communication received from another via an instant messenger application) may be stored as contextual content associated with the phone number. Contextual content, therefore, may identify circumstances surrounding receipt of a phone number (e.g., date or time the phone number was received) and may be associated with descriptive content. Contextual content, may, for example, be used to subsequently search for associated descriptive content. For example, a search for phone numbers received from specific individuals, received via an instant messenger application or at a given date or time, may be initiated.

A profile builder may initiate generation of a profile for users of an application, including search engine users, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example.

A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of news streams or search results, such as with respect to a particular user.

User profile determination module 406 analyzes the user activity 402 to create the user profile. In one embodiment, each item viewed by the user is analyzed 404 to determine one or more of topic, people mentioned in the news item, keywords within the item, dates within the item, publisher of the item, dwell time, etc.

The dwell time contributes to the determination of what kind of news the user wants. For example, if a user spends watching sports news 10% more time than when watching other types of content, the dwell time is used to determine an interest of the user in sports. Similarly, if the user spends 10% less time, on average, on financial news, the financial topics will have a lower score when calculating the news stream. In other words, the dwell time provides a normalized user engagement level for different types of news categories, as well as news topics.

In one embodiment, the user profile may include one or more of name, age, gender, address, click history, dwell times, normalized user engagement levels, etc.

Figure 5:
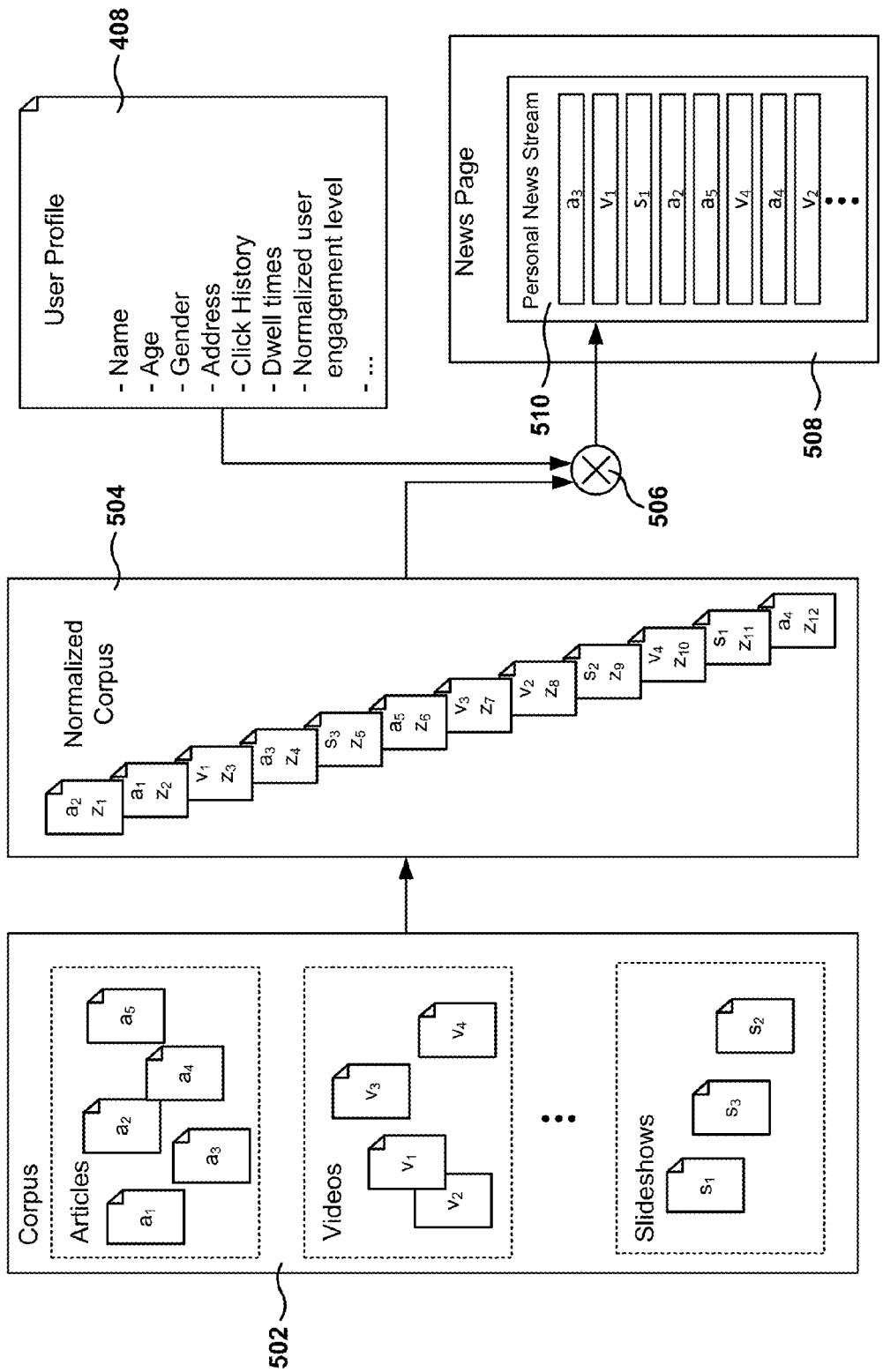
FIG. 5 illustrates the creation of a personal news stream based on the normalized corpus and the user profile, according to one embodiment.

FIG. 5 illustrates the creation of a personal news stream based on the normalized corpus and the user profile, according to one embodiment. The corpus 502 of potential news items, including news articles, videos, slideshows, photos, etc., is sorted according to the estimated value to the user in order to deliver the news items of interest to the user.

Dwell time cannot be used directly to compare performance of different types of media. For example, the average time to watch a video may be five minutes, while the average time to read an article may be two minutes. A user may watch a video for a minute, but if the video is 10 minutes long, that would mean poor performance for the video. However, if the user spends a minute in a short news article, this could be considered good performance.

Therefore, when sorting the news stream, different metrics are needed for different types of media. In one embodiment, the corpus is normalized based on the dwell time for the different types of news items. The user experience is normalized for the different types of content in order to sort the stream with the different types of content.

After obtaining the dwell times for the average user, normalized values of the log(dwelltime) may be obtained based on the statistical parameters for each of the types of media (see equation (1)). The result is a normalized corpus 504, where the potential value for each news item to be introduced in the news stream is normalized according to the type of media associated with each news item.

Each news items will have an intrinsic value for being presented as news, based on many factors such as date of creation, people mentioned in the article, response by other readers, etc. The use of dwell time allows the news corpus to be normalized allowing the comparison of news items of different categories by providing an adjustment based on the type of media. Therefore, the methods presented herein to create a personal news stream may be combined with other methods for selecting news from a news corpus. The use of dwell time enables a comparison of items of different types.

It is noted that some of the items in the news corpus may have dwell times associated with them, while other items, because of their novelty, do not have dwell times associated with them. However, the statistical parameters based on dwell time for the different types of media may be used for items that do or do not have dwell times associated therewith.

The normalized corpus 504 is sorted 506 based on the intrinsic article-interest parameters associated with the items in the corpus and based on the user profile 408. In one embodiment, the score associated with the news article is the inner product between the score inherent to the news article and the parameters in the user profile. The score inherent to the news article is a score that is not based on the profile any user, or that is based on the average of the profile of all users.

As mentioned above, there could be other parameters used in the creation of the personal news stream, such as video quality, news articles going viral, geographic location of interest, and other features found in the article, such as keywords, phrases, famous people mentioned in the article, dates mentioned in the article, etc. For some items, a rough measurement for the interest on the news item can be obtained, after one or two days, based on the dwell time for the news item, because many users are accessing the article and spending time viewing the article.

The dwell time scores are available about historical news, but the scores may not be available for new items. Therefore, new items are sorted based on the features found in the news item, as well of the normalized values applied for the category of the news item. The result is a priority value for the news item, and the personnel news stream 510, inside news page 508, is sorted based on the priority value for the news items in corpus 504.

By looking at the user profile 408, the personal news streams 510 takes into consideration the interests and desires of the user. For example, if a user likes sports, the sports articles will be given high priority in the stream, taking into account their ratings for each of the sport articles (which can be articles, videos, slideshows, etc.).

It is noted that the embodiments illustrated in FIG. 5 are exemplary. Other embodiments may utilize different operations, user profile parameters, additional metrics for sorting the news stream, etc. The embodiments illustrated in FIG. 5 should therefore not be interpreted to be exclusive or limiting, but rather exemplary or illustrative.

Figure 6:
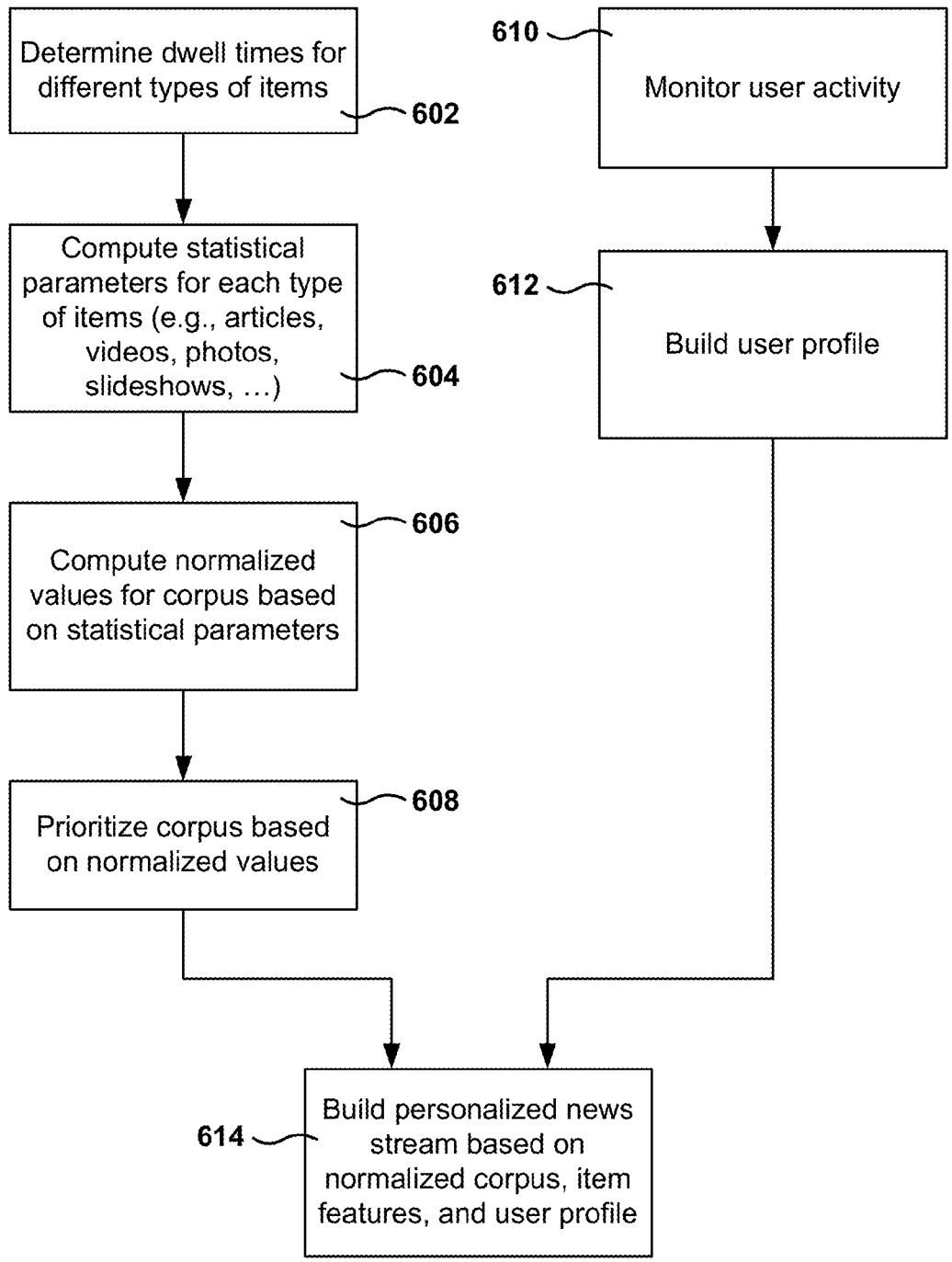
FIG. 6 is a flowchart illustrating an algorithm for building a personalized new stream, according to one embodiment.

FIG. 6 is a flowchart illustrating an algorithm for building a personalized new stream, according to one embodiment. While the various operations in this flowchart are presented and described sequentially, one of ordinary skill will appreciate that some or all of the operations may be executed in a different order, be combined or omitted, or be executed in parallel.

There are two branches of the method described in FIG. 6: a left branch describing how to normalize news items of different categories, and a right branch related to the use of user profiles.

With reference to the normalization of news items, in operation 602, the dwell time for different types of items from a news corpus is determined. The different types of items may be news articles, videos, blogs, tweets, slideshows, etc. From operation 602, the method flows to operation 604 to compute the statistical parameters for each type of item.

From operation 604, the method flows to operation 606 where normalized values are computed for items in the corpus based on the statistical parameters calculated for each of the news categories. From operation 606, the method flows to operation 608 where the corpus is prioritized based on the normalized values. Of course, other factors besides dwell time may be used when creating the personal news streams in order to prioritize the items in the purpose for presentation to a particular user.

From operation 608, the method flows to operation 614 where a personalized news stream is built based on the normalized corpus computed in operation 606, the features defined in each news item, and the user profile.

With reference to the use of user profiles, in operation 610 the method monitors user activity to identify user preferences. From operation 610, the method flows to operation 612 where a user profile is built based on user activity (and may be other factors, such as user configured data, user social data, etc.). From operation 612, the method flows to operation 614.

Figure 7:
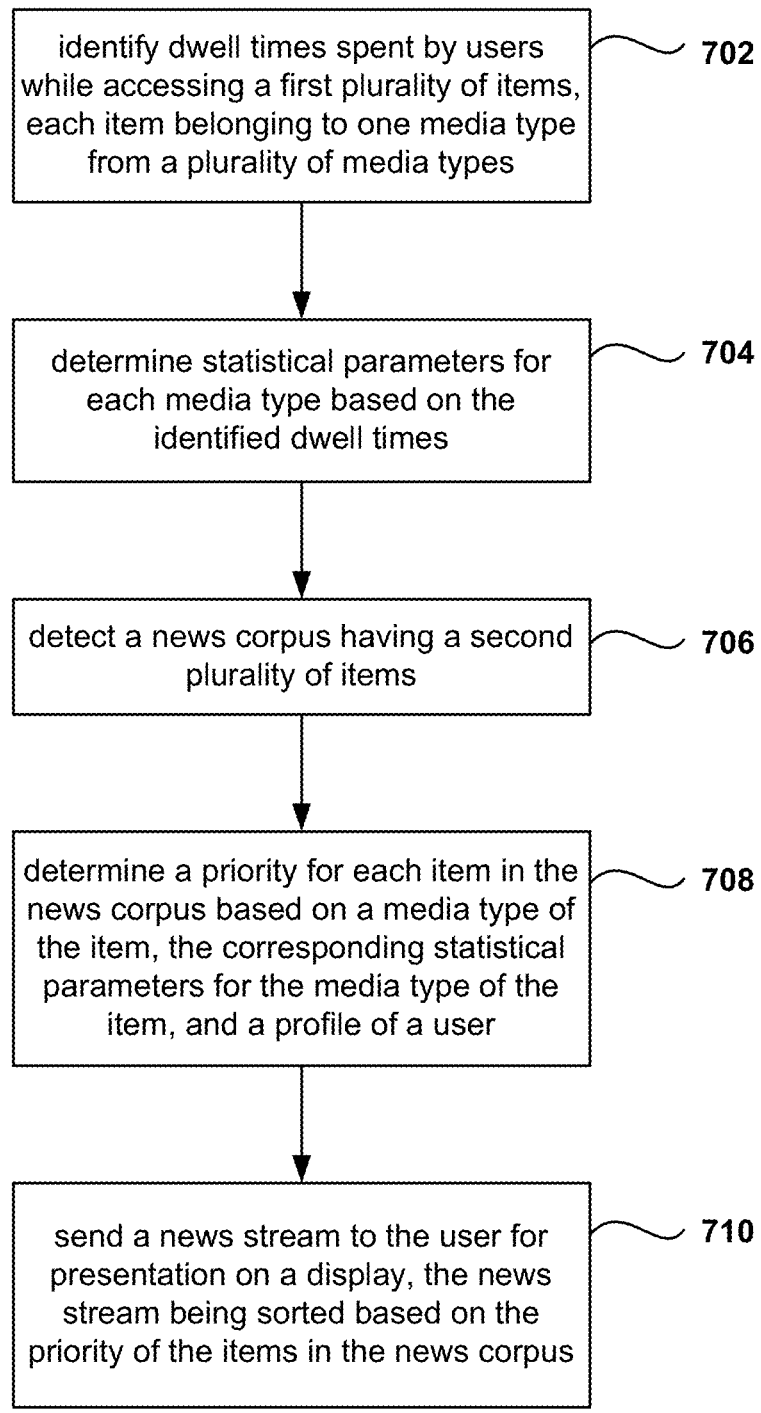
FIG. 7 is a flowchart illustrating an algorithm for displaying a customized news stream in accordance with one embodiment.

FIG. 7 is a flowchart illustrating an algorithm for displaying a customized news stream in accordance with one embodiment. While the various operations in this flowchart are presented and described sequentially, one of ordinary skill will appreciate that some or all of the operations may be executed in a different order, be combined or omitted, or be executed in parallel.

In operation 702, the method identifies dwell times spent by users while accessing a first plurality of items, each item belonging to one media type from a plurality of media types. From operation 702, the method flows to operation 704 where statistical parameters for each media type are determined based on the identified dwell times in operation 702.

From operation 704, the method flows to operation 706 where a news corpus, having a second plurality of items, is detected. From operation 706, the method flows to operation 708 when the method determines the priority for each item in the news corpus based on the media type of the item, the corresponding statistical parameters for the media type of the item, and the profile of a user.

From operation 708, the method flows to operation 710 where a new stream is sent to the user (e.g., a computing device utilized by the user) for presentation on a display. The news stream is sorted based on the priority of the items in the news corpus. In one embodiment, one or more operations of the method are executed by a processor.

Figure 8:
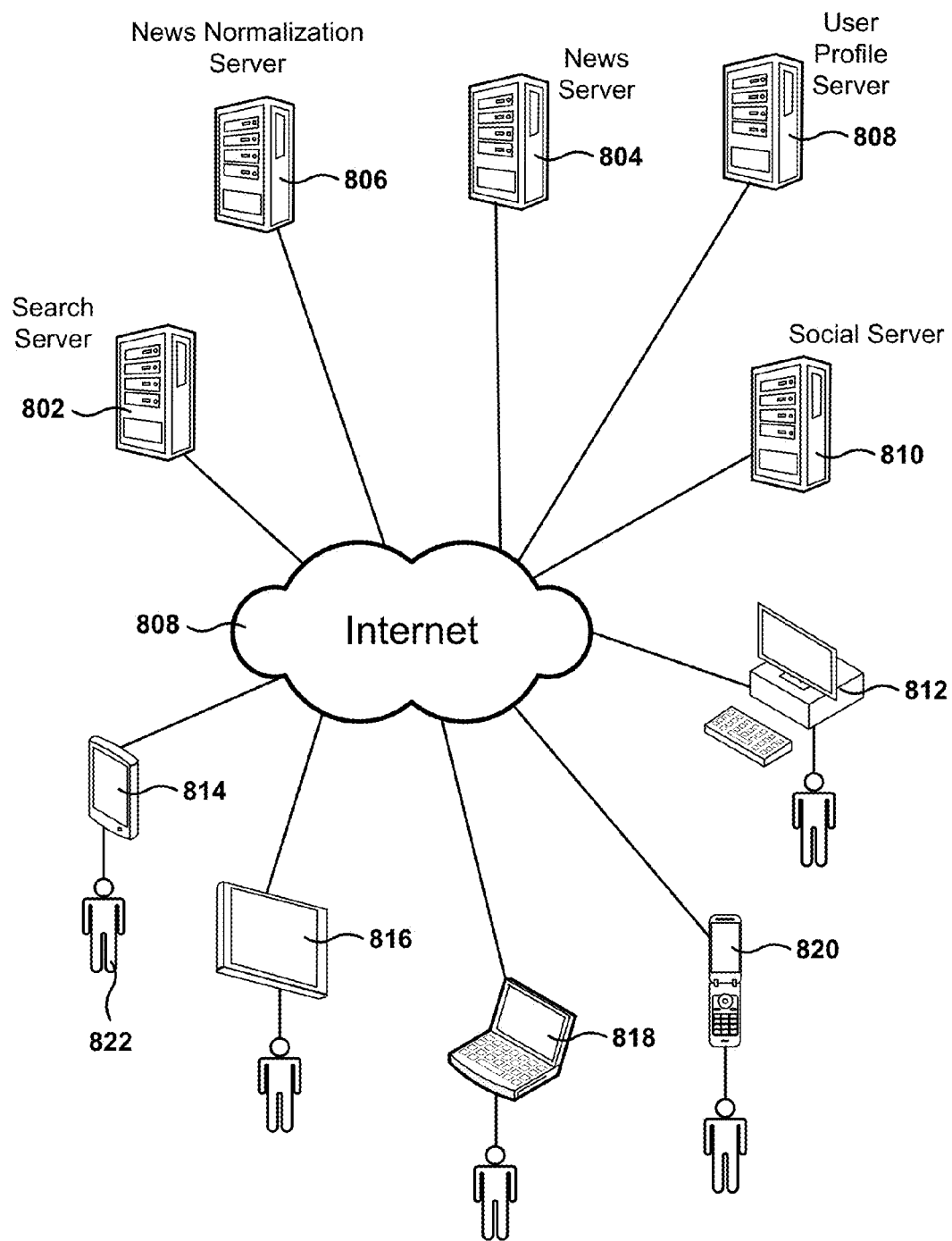
FIG. 8 is a simplified schematic diagram of a computer system for implementing embodiments of the present disclosure.

FIG. 8 is a simplified schematic diagram of a computer system for implementing embodiments of the present disclosure. Internet 808 is used to interconnect users with servers. Users 822 access Internet 808 via a variety of devices, such as smart phone 814, tablet 816, laptop 818, mobile phone 820, personal computer 812, etc. These are merely examples, and any other device used to access Internet 808 can be used to implement embodiments of this disclosure. For example, the devices may be wired or wireless. In one embodiment, a browser is executed on a device, and the graphical user interface is presented on a display. The browser provides the functionality for accessing the Internet.

Search server 802, also known as a web search engine, provides search features to Internet users. A web search engine is designed to search for information on the World Wide Web. The search results are generally presented in a list of results and are sometimes called hits. The information may consist of web pages, news pages, blogs pages, images, etc. Unlike web directories, which are maintained by human editors, search engines operate algorithmically, or use a mixture of algorithmic and human input.

News server 804 provides news to users. One example of a news server is Yahoo!® News. News may originate from a variety of sources, not just from inside the search engine website. The news search engine scouts the Internet looking for news articles, which are then made available to users. Users may access the news by selecting news articles in the website of the news search engine, searching the news by entering search terms in a search field, or selecting a news category, such as politics, sports, weather, etc.

News Normalization server 806 categorizes news items to determine relative scores based on dwell time and other features of the news items. News Normalization server 806 may utilize information from news server 804, search server 802, social server 810, etc. Social Server 810 provides social network services to Internet users.

User Profile Server 808 builds user profiles for users utilizing new services. The profiles are based on user activity and user characteristics, but other factors may also be considered.

Although different servers are described by way of example, the person skilled in the art will appreciate that multiple configurations are possible by combining several servers into one system, by having distributed systems where a single function can be accomplished by a plurality of different servers scattered across the Internet, or by caching information from the different databases at the different servers to accelerate the processing of information.

Figure 9:
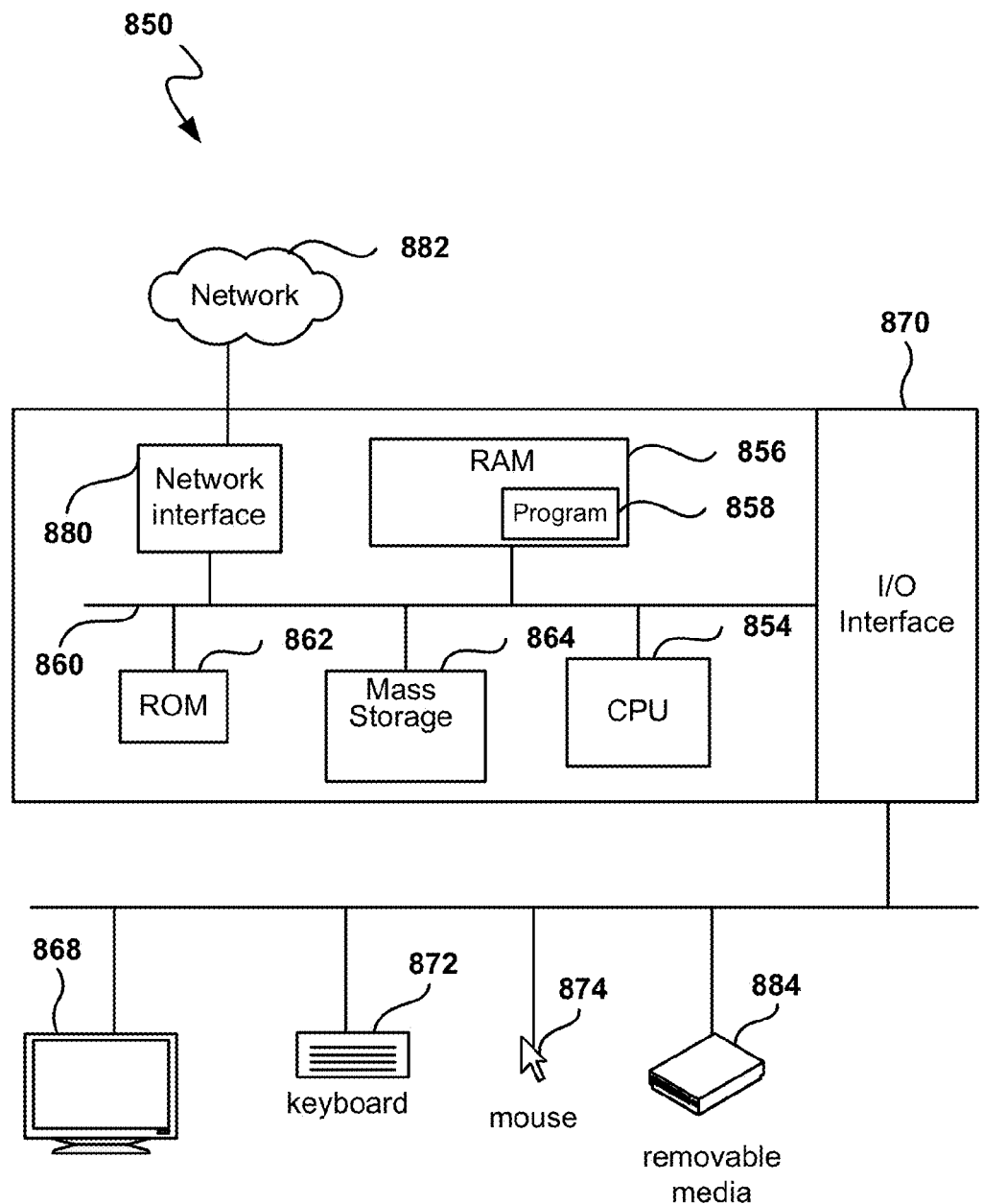
FIG. 9 is a simplified schematic diagram of a computer system for implementing embodiments of the present disclosure.

FIG. 9 is a simplified schematic diagram of a computer system 850 for implementing embodiments of the present disclosure. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 854, which is coupled through bus 860 to random access memory (RAM) 856, read-only memory (ROM) 862, and mass storage device 864. Computer program 858 for searching relevant news articles resides in random access memory (RAM) 856, but can also reside in mass storage 864.

Mass storage device 864 represents a persistent data storage device such as a floppy disc drive or a fixed disc drive, which may be local or remote. Network interface 880 provides connections via network 882, allowing communications with other devices. It should be appreciated that CPU 854 may be embodied in a general-purpose processor, a special purpose processor, or a specially programmed logic device. Input/Output (I/O) interface provides communication with different peripherals and is connected with CPU 854, RAM 856, ROM 862, and mass storage device 864, through bus 860. Sample peripherals include display 868, keyboard 872, cursor control 874, removable media device 884, etc.

Display 868, is configured to display the user interfaces described herein. Keyboard 872, cursor control 874, removable media device 884, and other peripherals are coupled to I/O interface 870 in order to communicate information in command selections to CPU 854. It should be appreciated that data to and from external devices may be communicated through I/O interface 870. The embodiments can also be practiced in distributed computing environments where tasks are performed by remote processing devices that are linked through a wire-based or wireless network.

Embodiments of the present disclosure may be practiced with various computer system configurations including hand-held devices, microprocessor systems, microprocessor-based or programmable consumer electronics, minicomputers, mainframe computers and the like. The embodiments may also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for sending a customized news stream to be displayed on a user device, the method comprising:
    identifying, by one or more servers, dwell times spent by a plurality of users while accessing a plurality of items, each item belonging to one media type from a plurality of media types, the plurality of media types having varying average dwell times, wherein the dwell time of an item is based on an amount of time that the item is displayed to each user that views the item;
    for each media type, determining, by the one or more servers, statistical parameters for the each media type based on the items belonging to the each media type, wherein determining the statistical parameters for each media type includes,
        calculating an average dwell time for items of the each media type, and
        calculating a standard deviation of the dwell times for items of the each media type;
    obtaining, at the one or more servers, a normalized dwell time for each item, the normalized dwell time of an item based upon a quotient of a difference between the dwell time of the item and the average dwell time for items of the media type, and the standard deviation of the dwell times for items of the media type, wherein normalized dwell times are a standardized measurement of the dwell times that enable ranking of items of different media types;
    determining, at the one or more servers, a priority for each item of the plurality of items based on the normalized dwell time of each item and a profile of a user; and
    sending, from the one or more servers, a news stream to the user device for presentation on a display associated with the user device, the news stream configured to be presented on the display associated with the user device in an order based on the priority of the items of the plurality of items, wherein the news stream includes items of two or more different media types, wherein operations of the method are executed by a processor.

2. The method as recited in claim 1, wherein determining the priority further includes:
    determining a first priority value for each item based on features within the item determined to be of interest to the user.

3. The method as recited in claim 1, wherein determining the priority further includes:
    determining a media-type priority value based on the media type of the item and the corresponding statistical parameters for the media type of the item; and
    determining the priority for the each item based on the media-type priority value of the each item and the profile of the user.

4. The method as recited in claim 1, wherein determining the priority further includes:
    determining a third priority value based on a popularity score of the item.

5. The method as recited in claim 1, wherein the profile includes features of interest for the user based on items viewed by the user.

6. A non-transitory computer-readable storage medium storing a computer program for sending a customized news stream to be displayed on a user device, the computer-readable storage medium comprising:
    program instructions for identifying, by one or more servers, dwell times spent by a plurality of users while accessing a plurality of items, each item belonging to one media type from a plurality of media types, the plurality of media types having varying average dwell times, wherein the dwell time of an item is based on an amount of time that the item is displayed to each user that views the item;
    program instructions for determining, by the one or more servers, statistical parameters for each media type based on the items belonging to the each media type, wherein determining the statistical parameters for each media type includes,
        calculating an average dwell time for items of the each media type, and
        calculating a standard deviation of the dwell times for items of the each media type;
    program instructions for obtaining, at the one or more servers, a normalized dwell time for each item, the normalized dwell time of an item based upon a quotient of a difference between the dwell time of the item and the average dwell time for items of the media type, and the standard deviation of the dwell times for items of the media type, wherein normalized dwell times are a standardized measurement of the dwell times that enable comparison between items of different media types;
    program instructions for determining, at one or more servers, a priority for each item of the plurality of items based on the normalized dwell time of each item and a profile of a user; and
    program instructions for sending, from the one or more servers, a news stream to the user device for presentation on a display associated with the user device, the news stream being configured to be presented on the display associated with the user device in an order based on the priority of the items of the plurality of items, wherein the news stream includes items of two or more different media types.

7. The computer-readable storage medium as recited in claim 6, wherein determining the priority further includes:
    determining a first priority value for each item based on features within the item determined to be of interest to the user.

8. The computer-readable storage medium as recited in claim 6, wherein determining the priority further includes:
    determining a media-type priority value based on the media type of the item and the corresponding statistical parameters for the media type of the item; and
    determining the priority for the each item based on the media-type priority value of the each item and the profile of the user.

9. The computer-readable storage medium as recited in claim 6, wherein determining the priority further includes:
    determining a third priority value based on a popularity score of the item.

10. A method for displaying a customized news stream, the method comprising:

identifying, by one or more servers, dwell times spent by a plurality of users while accessing a plurality of items, each item belonging to one media type from a plurality of media types, wherein the plurality of media types includes types selected from a group consisting of news articles, videos, photographs, short messages, slideshows, or blogs, the plurality of media types having varying average dwell times;

for each media type, determining, by the one or more servers, statistical parameters for the each media type based on statistical analysis of the identified dwell times for the items belonging to the each media type;

obtaining, at the one or more servers, a normalized dwell time for each item, the normalized dwell time of an item based upon a quotient of a difference between the dwell time of the item and the average dwell time for items of the media type, and the standard deviation of the dwell times for items of the media type, wherein normalized dwell times for items of a given media type are made to be comparable to that of items of each of the other media types of the plurality of media types;

determining, at the one or more servers, a first priority for each item in the plurality of news items based on the normalized dwell time of each item;

determining, at the one or more servers, a second priority for each item in the plurality of news items based on the first priority and a profile of a user; and sending, from the one or more servers, a news stream to the user for presentation on a display associated with the user device, the news stream being configured to be presented on the display associated with the user device in an order based on the second priority of the items in the plurality of news items, wherein operations of the method are executed by a processor.

11. The method as recited in claim 10, wherein the dwell time of an item is based on an amount of time that the item is displayed to a user.

12. The method as recited in claim 10, wherein determining the statistical parameters for each media type includes, calculating an average dwell time for items of the each media type, and calculating a standard deviation of the dwell times for items of the each media type.

13. The method as recited in claim 10, wherein the profile includes features of interest for the user based on items viewed by the user.

14. The method as recited in claim 10, wherein operations of the method are performed by a computer program when executed by one or more processors, the computer program being embedded in a non-transitory computer-readable storage medium.

* * * * *